UNITED STATES PATENT OFFICE.

ANNIE NEWCOM AND JENNIE NEWCOM, OF TERRELL, TEXAS.

HAIR-TONIC.

No. 885,073.          Specification of Letters Patent.          Patented April 21, 1908.

Application filed August 19, 1907. Serial No. 389,263.

*To all whom it may concern:*

Be it known that we, ANNIE NEWCOM and JENNIE NEWCOM, citizens of the United States, residing at Terrell, in the county of Kaufman and State of Texas, have invented certain new and useful Improvements in Hair-Tonics; and we do hereby declare the following to be a full, clear, and exact description of the invention, such as will enable others skilled in the art to which it appertains to make and use the same.

Our invention relates to new and useful improvements in medical compounds and more particularly to a hair and scalp preparation and our object is to provide a preparation of this class to be used in cleaning the scalp and also for medicinal treatment of the hair, whereby the hair will be strengthened and the life thereof prolonged, thus preventing premature baldness.

Other objects and advantages will be hereinafter referred to and more particularly pointed out in the claims.

The compound or preparation consists of the following ingredients, in, or about the proportions stated, viz:

Quince seed _____ 4 ounces
    Citric acid _____ 2 drams
    Sodium borate _____ 2 drams
    Bichlorid of mercury ____ 15 grains
    Glycerin _____ 2 ounces
    Oil of citronella _____ 3 drops
    Oil of rose geranium ____ 10 drops
    Carmine in quantities to color
    Water in quantities to make 32 ounces.

In preparing the compound, a mucilage is first made from the quince seed by macerating the seed and mixing the same with water, the proportion of the seed and water being substantially two ounces of the macerated seed to each pint of water. The macerated product after being immersed in the water is allowed to stand for three days, more or less, and the temperature of the water is to be normal. After the macerated product has stood the proper length of time in the water, it is strained by pouring the same through a cheese cloth or other suitable straining device. The citric acid, sodium borate and bichlorid of mercury are dissolved in a little water and the glycerin, oil of citronella and oil of rose geranium are to be dissolved in alcohol, the proportion of alcohol used being substantially 1 dram to each pint of the finished product. The dissolved ingredients are then mixed together and the mucilage from the quince seed added. To this mixture then add the carmine solution to color, after which a sufficient quantity of water is added to increase the bulk of the preparation to 32 ounces.

The preparation when applied to the hair and scalp will thoroughly cleanse the scalp of dandruff or the like and stimulate the same. At the same time, the roots of the hair are strengthened, which, in effect, restrains or prevents the hair from falling out and will soften dry or wiry hair and retain the natural color of the same, thereby preventing premature baldness, or gray hairs.

The mixture is applied to the hair and scalp of the head in the usual, or any preferred manner, once daily and about one teaspoonful is to be used at each application.

What I claim is:

The herein described hair tonic, consisting of mucilage of quince seed, citric acid, sodium borate, bichlorid of mercury, glycerin, oil of citronella, oil of rose geranium, carmine and water in the proportions specified.

In testimony whereof we have signed our names to this specification in the presence of two subscribing witnesses.

ANNIE NEWCOM.
                  JENNIE NEWCOM.

Witnesses:
    E. T. MORROW,
    M. N. RALEY.